United States Patent
Palo

(10) Patent No.: US 9,988,005 B2
(45) Date of Patent: Jun. 5, 2018

(54) ROLL FORMED BUMPER BEAM AND METHOD FOR MANUFACTURING A BUMPER BEAM

(71) Applicant: Gestamp Hardtech AB, Lulea (SE)

(72) Inventor: Daniel Palo, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 150 days.

(21) Appl. No.: 15/127,136

(22) PCT Filed: Mar. 20, 2015

(86) PCT No.: PCT/SE2015/000015
§ 371 (c)(1),
(2) Date: Sep. 19, 2016

(87) PCT Pub. No.: WO2015/160298
PCT Pub. Date: Oct. 22, 2015

(65) Prior Publication Data
US 2018/0029549 A1    Feb. 1, 2018

(30) Foreign Application Priority Data
Apr. 15, 2014 (SE) ...................................... 1400201

(51) Int. Cl.
B60R 19/18 (2006.01)
B21B 1/08 (2006.01)
B23K 26/26 (2014.01)
B23K 101/00 (2006.01)

(52) U.S. Cl.
CPC ............... *B60R 19/18* (2013.01); *B21B 1/08* (2013.01); *B23K 26/26* (2013.01); *B23K 2201/006* (2013.01); *B60R 2019/1813* (2013.01)

(58) Field of Classification Search
CPC ... B60R 19/18; B60R 2019/1813; B21B 1/08; B23K 26/26; B23K 2201/006
See application file for complete search history.

(56) References Cited

U.S. PATENT DOCUMENTS

| | | |
|---|---|---|
| 2004/0130166 A1 | 7/2004 | Trancart et al. |
| 2009/0165520 A1 | 7/2009 | Koo et al. |
| 2012/0074720 A1 | 3/2012 | Johnson et al. |
| 2012/0139273 A1 | 6/2012 | Jeong et al. |

FOREIGN PATENT DOCUMENTS

| | | |
|---|---|---|
| DE | 10 2008 016224 | 10/2009 |
| EP | 1 854 675 | 11/2007 |
| JP | 2001 062532 | 3/2001 |
| JP | 2006 207724 | 8/2006 |

*Primary Examiner* — D Glenn Dayoan
*Assistant Examiner* — Melissa A Black
(74) *Attorney, Agent, or Firm* — Mark P. Stone

(57) ABSTRACT

A bumper beam is roll formed so that it gets a closed cross section with, along the length, constant cross section having at least two closed chambers (15, 16) separated by an essentially horizontal partition wall (14). Each chamber has a side (19), which is turned away from the vehicle, with at least one longitudinal concave portion (20, 21; 22, 23) extending along the entire length and one side (24), which is facing the vehicle, with at least one longitudinal convex portion (25, 26; 27, 28) extending along the entire length. After the roll forming, some portions (32) of the cross section are pressed together vertically or horizontally in order to adapt the deformation properties.

20 Claims, 3 Drawing Sheets a b c d e f g h

ROLL FORMED BUMPER BEAM AND METHOD FOR MANUFACTURING A BUMPER BEAM

TECHNICAL FIELD OF THE INVENTION

The invention relates to a roll formed bumper beam with a, along the length, constant width of the original strip and a cross section with at least two closed chambers separated by an essentially horizontal intermediate wall, wherein each chamber has a side turned away from the vehicle with at least one, along the entire length, longitudinal inwards curved portion. The invention also relates to a method for manufacturing a beam.

BACKGROUND OF THE INVENTION

US 2012/0074720A1 shows a roll formed beam of this kind with a constant cross section along the entire length. JP P2001-62532A shows a beam with a quadratic cross section and ends folded together in order to reduce the horizontal dimensions of the ends.

THE PURPOSE OF THE INVENTION

It is an object of the invention to be able to provide in an economical way a bumper beam with desired properties. Another object is to enable manufacturing of bumper beams adapted to different vehicles in one and the same manufacturing unit without large investments.

SHORT DESCRIPTION OF THE INVENTION

The object of the invention is fulfilled when roll forming so that the chambers are provided with an outwards curved side and an inwards curved side and, after the roll forming, changing a certain portion of the cross section by pressing it together and thereby changing the properties of the beam. The invention is defined by the claims.

SHORT DESCRIPTION OF THE DRAWINGS

Figure 3:
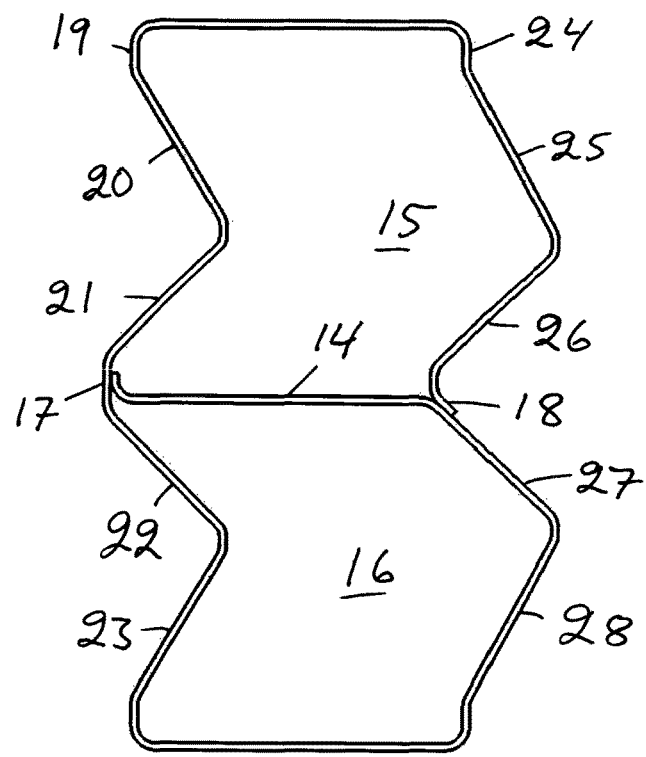
FIG. 3 is a section taken along the line 3-3 in FIG. 2.

FIGS. 5a-h show cross sections which are alternatives to the cross section shown in FIG. 3.

DESCRIPTION OF SHOWN EXAMPLES OF THE INVENTION

Figure 1:
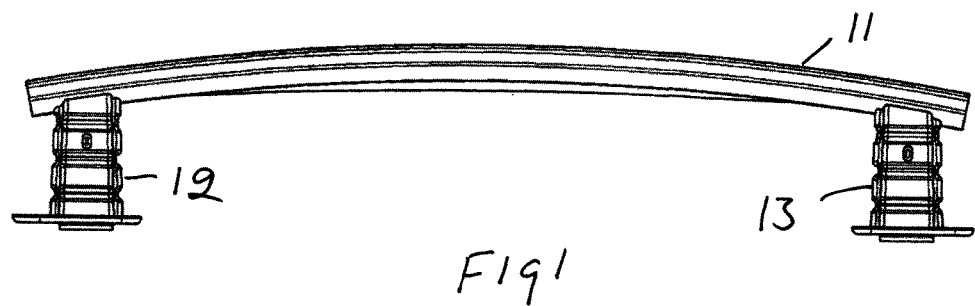
FIG. 1 shows as an example a front bumper in accordance with the invention seen from above.
Figure 2:
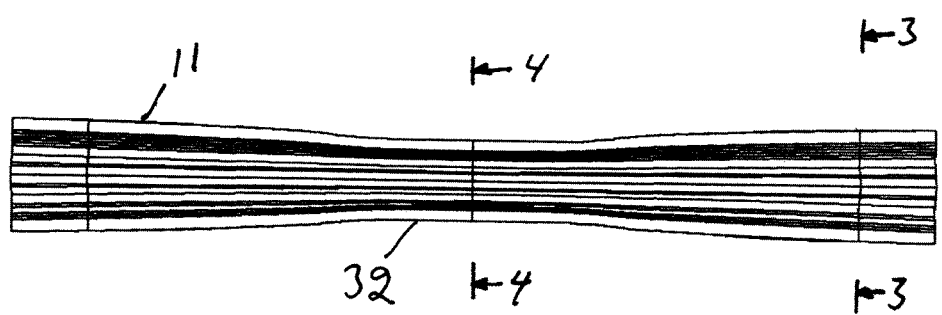
FIG. 2 shows the bumper according to FIG. 1 seen from the front.

FIG. 1 shows a bumper beam 11 which has two crash boxes 12, 13, welded thereon. The bumper beam 11-13 is intended as the front bumper of the vehicle and the crash boxes are adapted to be attached to the side beams of the vehicle. From a steel strip with constant width a profile is roll formed in a continuous process, the profile having a constant cross section along the length, which is then cut in suitable length. It is possible to roll form so that the profile becomes convex as is evident from FIG. 1. Alternatively, it is possible to bend each length after the cutting.

As is evident from FIG. 3 the profile is roll formed to have a horizontal web 14, i.e., an essentially horizontal partition wall 14 which divides the profile in an upper and a lower closed chamber 15, 16. Integrated with the roll forming the longitudinal edges of the profile are continuously laser welded to the sides of the profile at 17, 18, so that a rigid profile is achieved. The web increases the torsional rigidity as well as the bending rigidity. The web is also important for the deformation process and increases the energy absorption during a crash. The side 19 which is directed outwards from the vehicle forwards, i.e., forwards in the example with a front bumper, has for each one of the chambers a concave (inwards curved) portion which in the shown example consists of two essentially plane side portions 20, 21; 22, 23 at an angle to each other. The back side 24, i.e., the side which is facing the vehicle, has a corresponding convex (outwards curved) portion, which in the shown example consists of essentially plane side portions 25, 26; 27, 28 at an angle to each other. The side 19 facing forward has in the shown example its impact surfaces essentially along a straight line which is essentially vertical.

Figure 4:
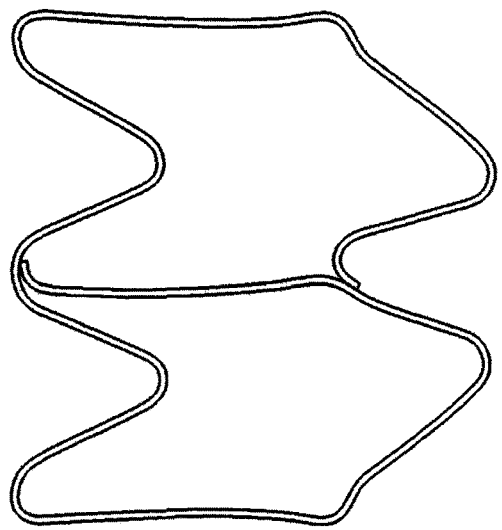
FIG. 4 is a section taken along the line 4-4 in FIG. 2.
Figure 5:
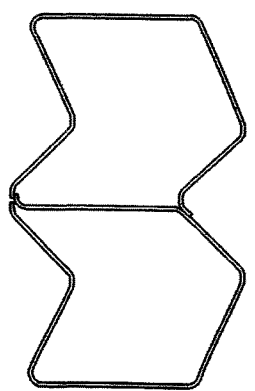
Figure 5:
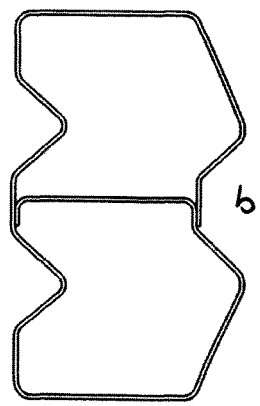
Figure 5:
Figure 5:
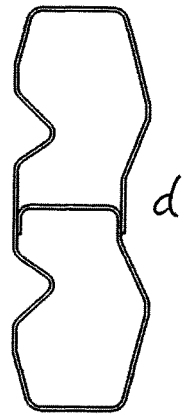
Figure 5:
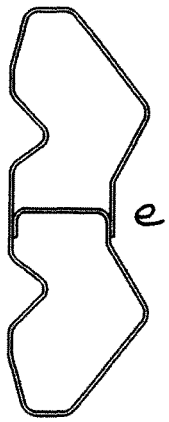
Figure 5:
Figure 5:
Figure 5:
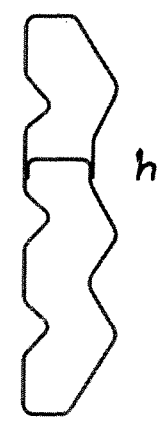

A portion 32, in the example shown as a central portion, of the length of the bumper has been pressed together vertically so that it has got the cross section shown in FIG. 4. The front surface 19 on each chamber 15, 16, is convex and the back side 24 is concave and for that reason the width of the cross section will increase during compression which increases the bending rigidity locally. The increased bending rigidity at the middle of the bumper beam which is achieved decreases the risk for a fold to form at crash load from straight ahead, which leads to the bumper beam collapsing locally. By horizontal pressing instead of vertical pressing the width of the cross section is decreased and may in this way decrease the bending rigidity locally. By using horizontal pressing it is also possible to change the radius of the bumper at the same time at the width of the profile is decreased, which is often desirable at the ends of the bumper.

By in this way pressing together parts of the length of the bumper beam, in the shown example less than half the length, it is possible to control, at a very low cost, the behavior of the bumper beam during crash load despite the fact that the width of the material and the basic profile of the beam are constant. It is also made possible to adapt one and the same basic profile to different vehicles. The profile is roll formed in continuous equipment and is cut in suitable lengths and desired compressions of the basic profile are made for adaption to different vehicles. The use of a beam manufactured according to the invention as a bumper is only one example on a use.

The invention claimed is:

1. Roll formed bumper beam with a constant width along the length of the strip from which it is formed and a cross section with at least two closed chambers (15, 16) separated by an essentially horizontal partition wall (14), wherein each chamber has a side (19) which is turned away from the vehicle and with at least one longitudinal inwards curved part (20, 21; 22, 23) extending along the entire length, wherein each chamber (5, 16) has a side (24) facing the vehicle, said side having at least one longitudinal outwards curved portion (25, 26; 27, 28) extending along the entire length, and a portion (32) along the length of the bumper beam has a reduced height and increased width due to the fact that the sides of the chambers have been compressed vertically there.

2. Bumper beam according to claim 1, wherein the inwards curved and the outwards curved portion (20, 21, 22, 23 and 25, 26, 27, 28, respectively) constitutes at least 80% of the vertical height of each chamber.

3. Bumper beam according to claim 1, wherein the inwards curved and the outwards curved portion are formed by two side portions which are essentially plane and at an angle to each other.

4. Bumper beam according to claim 1, wherein the vertical height of the chambers (15, 16) is larger than the horizontal extension of the partition wall (14) in the cross section.

5. Bumper beam according to claim 1, wherein said portion (32) is a central portion along the length.

6. Bumper beam according to claim 5, wherein said portion (32) constitutes less than half of the length of the bumper beam.

7. Method for manufacturing a beam from sheet steel with a closed section by roll forming a beam from a plane blank so that the beam gets two closed chambers (15, 16) divided by a partition wall (14) and a constant cross section and both chambers have a side (19) with curved portions, wherein the roll forming is performed in such a way that the chambers (15, 16) get an outwards curved side (24) and an inwards curved side (19) and that, after the roll forming, a certain portion (32) of the cross section is changed by compressing it.

8. Method according to claim 7, wherein the beam is roll formed so that the height of the chambers transverse to the partition wall becomes larger than the extension of the partition wall in the cross section.

9. Method according to claim 7, wherein the roll formed profile is laser welded together along the longitudinal edges of the original material.

10. Bumper beam according to claim 2, wherein the vertical height of the chambers (15, 16) is larger than the horizontal extension of the partition wall (14) in the cross section.

11. Bumper beam according to claim 3, wherein the vertical height of the chambers (15, 16) is larger than the horizontal extension of the partition wall (14) in the cross section.

12. Bumper beam according to claim 2, wherein said portion (32) is a central portion along the length.

13. Bumper beam according to claim 3, wherein said portion (32) is a central portion along the length.

14. Bumper beam according to claim 4, wherein said portion (32) is a central portion along the length.

15. Bumper beam according to claim 1, wherein said portion (32) constitutes less than half of the length of the bumper beam.

16. Bumper beam according to claim 2, wherein said portion (32) constitutes less than half of the length of the bumper beam.

17. Bumper beam according to claim 3, wherein said portion (32) constitutes less than half of the length of the bumper beam.

18. Bumper beam according to claim 4, wherein said portion (32) constitutes less than half of the length of the bumper beam.

19. Bumper beam according to claim 12, wherein said portion (32) constitutes less than half of the length of the bumper beam.

20. Method according to claim 8, wherein the roll formed profile is laser welded together along the longitudinal edges of the original material.

* * * * *